United States Patent
Thiel

(10) Patent No.: US 9,440,270 B2
(45) Date of Patent: Sep. 13, 2016

(54) FORCE SENSOR SYSTEM AND METHOD FOR MEASURING FORCES OF FILM STRIPS OR SHEET METAL STRIPS DURING ROLLING

(75) Inventor: Rolf Thiel, Winterthur (CH)

(73) Assignee: KISTLER HOLDING AG, Winterthur (CH)

( * ) Notice: Subject to any disclaimer, the term of this patent is extended or adjusted under 35 U.S.C. 154(b) by 594 days.

(21) Appl. No.: 13/996,176

(22) PCT Filed: Dec. 21, 2011

(86) PCT No.: PCT/CH2011/000306
§ 371 (c)(1),
(2), (4) Date: Jun. 20, 2013

(87) PCT Pub. No.: WO2012/083472
PCT Pub. Date: Jun. 28, 2012

(65) Prior Publication Data
US 2013/0298625 A1    Nov. 14, 2013

(30) Foreign Application Priority Data

Dec. 22, 2010  (CH) ...................................... 2145/10

(51) Int. Cl.
*B21B 38/08* (2006.01)
*G01L 5/04* (2006.01)
*G01L 5/00* (2006.01)
*B21B 38/02* (2006.01)

(52) U.S. Cl.
CPC ............ *B21B 38/08* (2013.01); *G01L 5/0004* (2013.01); *G01L 5/045* (2013.01); *B21B 38/02* (2013.01)

(58) Field of Classification Search
CPC ..... B21B 38/08; B23Q 17/005; G01L 5/0004; G01L 5/045
See application file for complete search history.

(56) References Cited

U.S. PATENT DOCUMENTS

| 4,024,755 A | 5/1977 | Quehen |
| 6,302,834 B2 * | 10/2001 | White ........................... 100/153 |
| 6,722,194 B2 | 4/2004 | Malard et al. |

FOREIGN PATENT DOCUMENTS

| EP | 1 048 370 | 11/2000 |
| WO | 2004/065924 | 8/2004 |

OTHER PUBLICATIONS

International Search Report, issued Feb. 6, 2012.
PCT/CH2011/000306, International Preliminary Report on Patentability, issued on Jun. 25, 2013.

* cited by examiner

*Primary Examiner* — Teresa M Ekiert
(74) *Attorney, Agent, or Firm* — Dority & Manning, P.A.

(57) ABSTRACT

A force sensor system for measuring forces that are transferred from film strips or sheet metal strips to a measuring roll during rolling in roll stands can be inserted into a cylindrical hole of a measuring roll under preload. The force sensor system includes a first force sensor and a preloading device for creating a preload on the first force sensor, so that the first force sensor can determine a force acting radially on the measuring roll. The first force sensor has a high sensitivity, which corresponds to the required measurement sensitivity of the contact force of the film strip or sheet metal strip. The force sensor system includes a second force sensor, which also can be placed under preload by means of the preloading device. The second force sensor is a statically measuring force sensor.

13 Claims, 4 Drawing Sheets

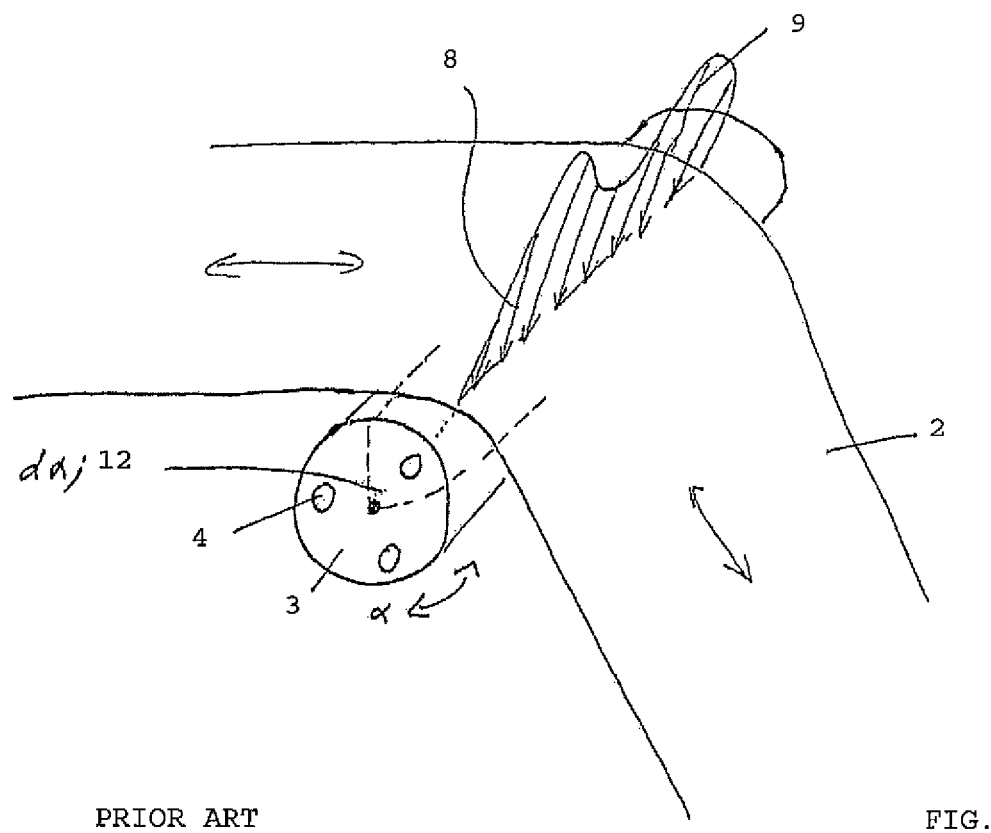
PRIOR ART  FIG. 1
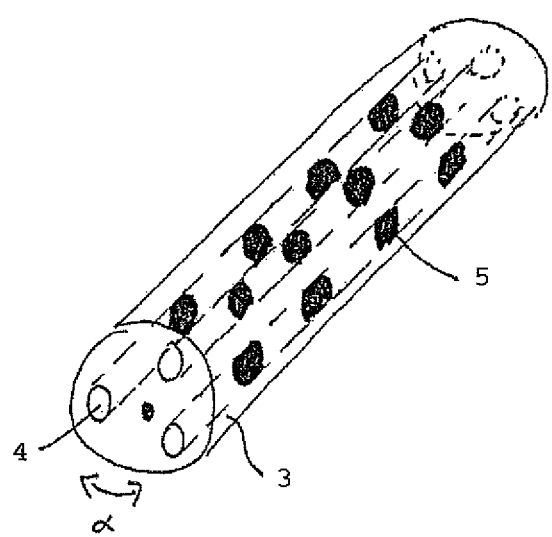
PRIOR ART  FIG. 2

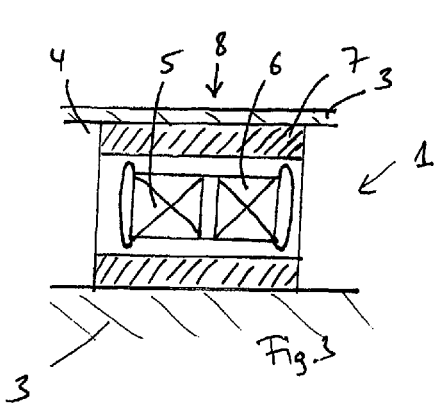
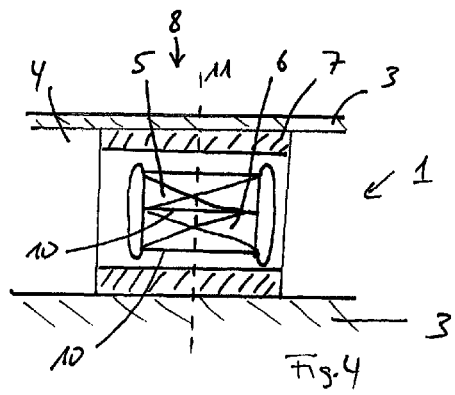
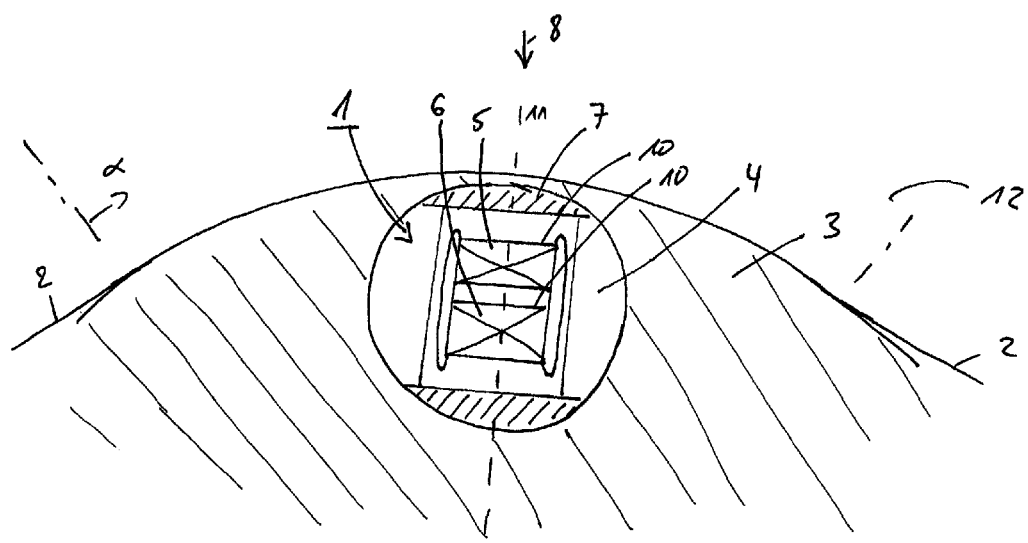

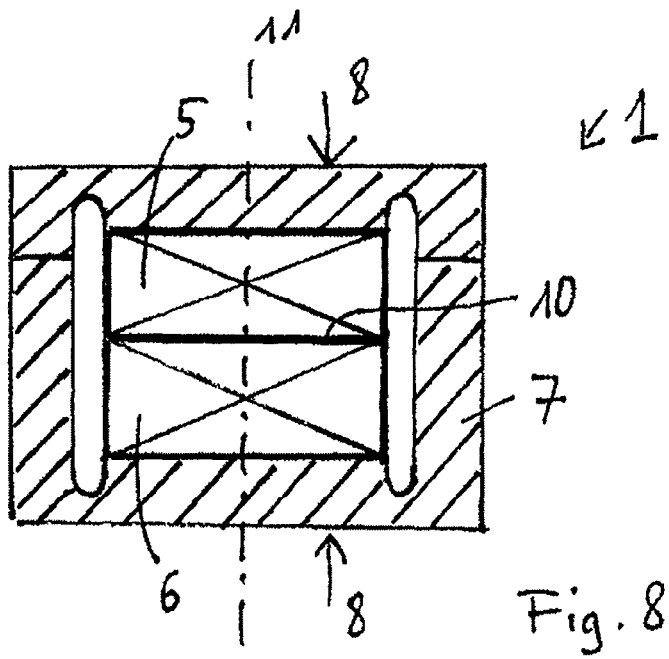
Fig. 8
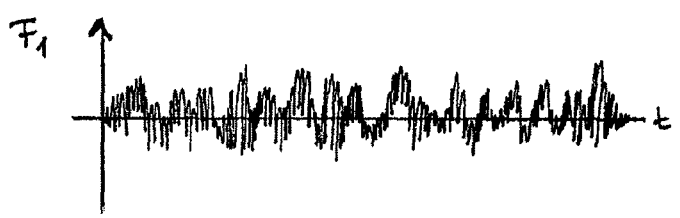
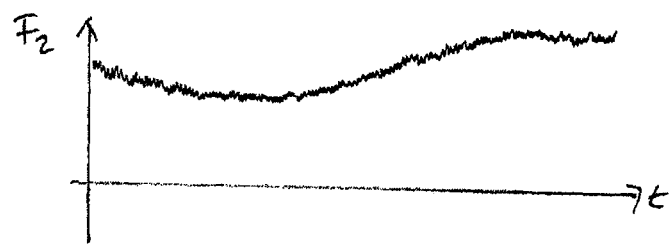
Fig. 9

FORCE SENSOR SYSTEM AND METHOD FOR MEASURING FORCES OF FILM STRIPS OR SHEET METAL STRIPS DURING ROLLING

CROSS-REFERENCE TO RELATED APPLICATIONS

This application claims priority to International Application Serial No. PCT/CH2011/000306, filed Dec. 21, 2011, which claims priority to Swiss Application No. CH 2145/10 filed Dec. 22, 2010. International Application Serial No. PCT/CH2011/000306 is hereby incorporated herein for all purposes by this reference.

FIELD OF THE INVENTION

The invention pertains to a force sensor system for measuring forces that are transferred from film strips or sheet metal strips to a measuring roll during rolling in roll stands, wherein the force sensor system can be inserted into a cylindrical bore of a measuring roll under prestress, and wherein the force sensor system comprises a force sensor, as well as a prestressing device for generating a prestress on the force sensor, such that the force sensor can determine a force that radially acts upon the measuring roll. The invention also pertains to a method for measuring the flatness of a film strip or sheet metal strip by means of such a force sensor system while said strip is rolled in roll stands.

BACKGROUND

Force sensor systems of the above-described type are used, for example, for determining the flatness of strips while they are processed in strip processing lines or roll stands.

Measuring rolls are used in the cold rolling of various types of sheet metal strips or film strips, wherein the strip is guided under tension over a measuring roll with a certain wrap angle and said measuring roll determines the distribution of stresses of the strips over their width by means of sensors integrated into the roll. Such measuring rolls typically feature a plurality of sensors that are arranged in radial bores of the measuring roll that are open toward the roll surface with high prestress or positioned in axially parallel bores closely underneath the surface of the measuring roll.

Alternatively, a clamping sleeve may also be clamped over the roll. EP 0433535 discloses a prestressing element that generates the desired prestressing force by means of an adjustable wedge. This force sensor system is characterized in that the prestressing force amounts to a multiple of the strip force to be measured.

External heating of the measuring roll due to the hot strip may cause a deformation of the roll geometry of the measuring roll and therefore lead to a change of the prestress. The changed prestress causes the measuring sensitivity of the sensors to change accordingly such that the previously measured calibration values are no longer correct.

WO2004/065924 describes a prestressing element for such a force sensor, and WO03/061856 also describes the prestressing devices, as well as the type of installation.

BRIEF SUMMARY OF THE INVENTION

In many applications, significant temperature differences occur in the measuring system during the operation and cause the prestress of the prestressed sensors to change. Depending on the design of the prestress generating system, the changed prestress results in a more or less significant change of the previously determined calibration values. The calibration values describe the sensitivity of the installed sensors in the force shunt of the type produced, for example, in a measuring roll.

In order to achieve a high measurement resolution, the charging amplifier, to which the piezoelectric force measuring sensors are connected, has a high amplification. The force measurement with piezoelectric sensors makes it possible to realize a force measurement with high resolution despite significant prestress by carrying out a reset on the charging amplifier at the beginning of the measurement. This reset causes the piezoelectric charge of the sensor generated under the prestress or prestressing force to be electrically set to zero such that the information on the intensity of the prestress no longer exists. A similar effect occurs if the charging amplifier is switched off and switched on again during a measurement.

It is the objective of the present invention to disclose a force sensor system of the initially cited type that makes it possible to always carry out correct force measurements despite significant temperature changes. The invention furthermore aims to disclose a method for carrying out such correct force measurements.

This objective is attained with the characteristics of the apparatus and method described more fully below.

The invention is based on the notion of providing the force sensor system of the initially cited type with a second force sensor in addition to the already described first force sensor, wherein said second force sensor can also be placed under prestress by means of the prestressing device. According to the invention, the first force sensor has a high sensitivity that corresponds to the required measuring sensitivity for the contact pressure of the film strip or sheet metal strip, and the second force sensor is a statically measuring force sensor.

To this end, the sensitivity characteristic in the force shunt of the first force sensor in dependence on the prestress is known beforehand.

In the inventive method, the two force sensors preferably do not carry out their measurements simultaneously, but rather successively such that the first sensor measures the force to be actually measured and the second sensor measures the prestress immediately before or after the effect of this force. This is helpful in preventing the superposition of the force to be measured on the second sensor. It would alternatively also be possible to correct the signal of the second sensor by the value of the force of the first sensor. The current sensitivity of the first force sensor is then determined from the prestress signal of the second sensor by means of the known characteristic. The acquired force signal is ultimately evaluated based on this determined current sensitivity.

Another decisive advantage of the inventive method can be seen in that it is also possible to determine if the prestress exceeds or falls short of a required limiting value such that the force signals can no longer be sensibly evaluated.

BRIEF DESCRIPTION OF THE DRAWINGS

The invention is described in greater detail below with reference to the drawings. In these drawings, FIG. 1 shows a perspective representation of a conventional measuring roll and a sheet metal strip or film strip transported over said measuring roll;

FIG. 2 shows a perspective representation of a conventional measuring roll with force measuring sensors or force measuring systems in bores designed for this purpose;

FIG. 3 shows a longitudinal section through an inventive force measuring system in a bore;

FIG. 4 shows a longitudinal section of a preferred embodiment of an inventive force measuring sensor in a bore;

FIG. 5 shows a cross section through an inventive force measuring system in a bore of a measuring roll;

FIG. 8 shows a force sensor system, and

FIG. 9 shows measuring signals of the first (F1) force sensor and the second (F2) force sensor.

DESCRIPTION OF EXEMPLARY EMBODIMENTS OF THE INVENTION

Figure 6:
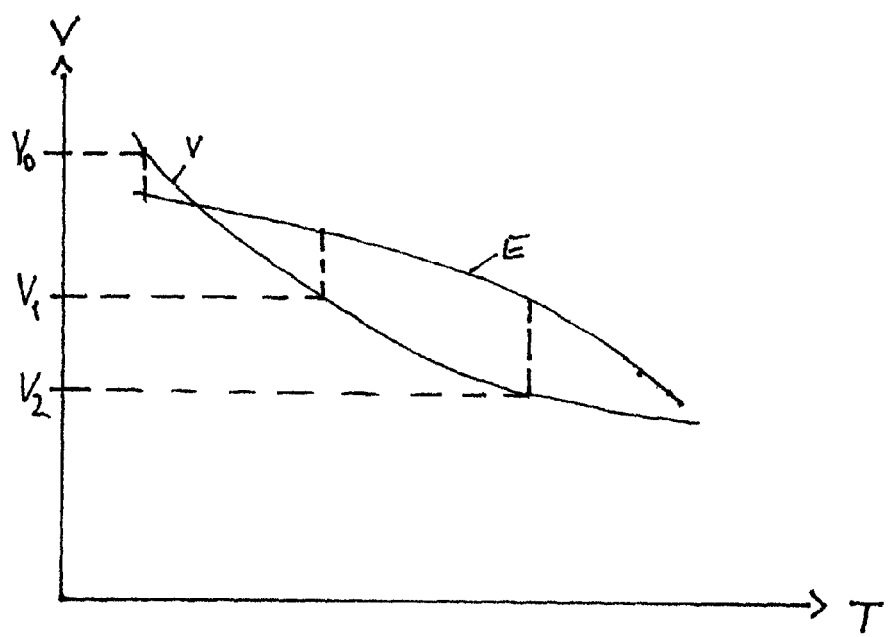
FIG. 6 shows the sensitivity characteristic of the first force sensor in dependence on the prestress.

The same reference symbols were used in all drawings.

FIG. 1 shows a sheet metal strip or film strip 2 that is transported over a correspondingly rotating measuring roll 3. In this case, the strip 2 is wrapped around a certain angular sector $d\alpha$ of the measuring roll 3 and generates a force F that radially acts upon the measuring roll 3 and is illustrated with arrows in this segment. The sensors distributed over the width of the measuring roll 3 make it possible to prepare a force profile 9 that is indicative of the flatness of the strip 2.

FIG. 2 once again shows such a measuring roll 3 without the strip 2. It typically comprises several bores 4 that are arranged closely underneath the surface of the measuring roll 3. These bores 4 are fitted over their entire length with force measuring sensors 5 that can measure the force F transferred from the strip 2 to the measuring roll 3 with the required sensitivity. It is preferred to use piezoelectric measuring sensors 5 for this purpose. These measuring sensors need to be installed under high prestress in order to ensure that they can carry out reliable measurements.

The heating or cooling of the measuring roll 3 caused by the strip 2 leads to an expansion of the measuring roll 3 on the surface. This causes a change of the prestress V that in turn leads to a change of the force shunt on the force sensor. Since the sensitivity of the force sensor 5 depends on the respectively predominant force shunt, the calibration values of the first force sensor 5 change over time.

FIG. 6 shows an example of the prestress V in dependence on the temperature T of the measuring roll 3. The sensitivity E at the respective prestress V is also indicated in the same diagram. If the prestress corresponds to V0 to V1 of the situation during the calibration, the current sensitivity E corresponds to the measurement during the calibration. In many instances, the calibration is carried out in a situation, in which the measuring roll is at room temperature. However, the measuring roll 3 is used under significantly fluctuating temperatures such that the current sensitivity E deviates from the calibration value.

The calibration values required for the evaluation of the measuring data can ultimately be determined based on the respectively dominant sensitivities E.

In order to determine the respectively predominant prestress, a second force sensor 6 and the first force sensor 5 are, according to the invention, integrated into a force sensor system 1. According to the invention, this second force sensor 6 is a statically measuring force sensor that can reliably measure forces over long periods of time. The second sensor 6 is realized, according to the invention, in the form of a resistive, optical or resonant sensor. It may consist, in particular, of a DMS sensor.

Two such examples of inventive force sensor systems 1 are illustrated in FIGS. 3 and 4.

In FIG. 3, the two force sensors 5, 6 are arranged adjacent to one another referred to the axis of the bore 4 or the measuring roll 3, respectively. A prestressing device 7 places both force sensors 5, 6 under the same prestress.

In FIG. 4, the two force sensors 5, 6 are arranged on top of one another referred to the force application direction 8 that respectively acts upon the measuring roll 3 radially. A prestressing device 7 also places both force sensors 5, 6 under the same prestress in this case. The advantage of this arrangement in comparison with the arrangement according to FIG. 3 can be seen in that both force sensors 5, 6 lie in the same force flow F and therefore are installed in series. In this way, it is ensured that the prestress on both force sensors 5, 6 is always identical.

Both force sensors 5, 6 are preferably realized in the form of cylindrical disks with the same base area 10, wherein their axes 11 are arranged coaxially and radially to the measuring roll 3.

This simplifies the conversion and prevents additional errors from slipping into the system.

FIG. 5 shows a cross section through the arrangement according to FIG. 4. The prestressing element used may be realized in accordance with the prior art, for example as described in WO2004/065924. The type of prestress is not discussed in greater detail with reference to the present figures. It is merely noted that is imperative to place each individual force sensor system 1 installed into each bore 4 of the measuring roll 3 under sufficiently high prestress. Since each bore 4 needs to be fitted with a plurality of such force sensor systems 1, the type of application of the prestress therefore is not irrelevant.

Figure 7:
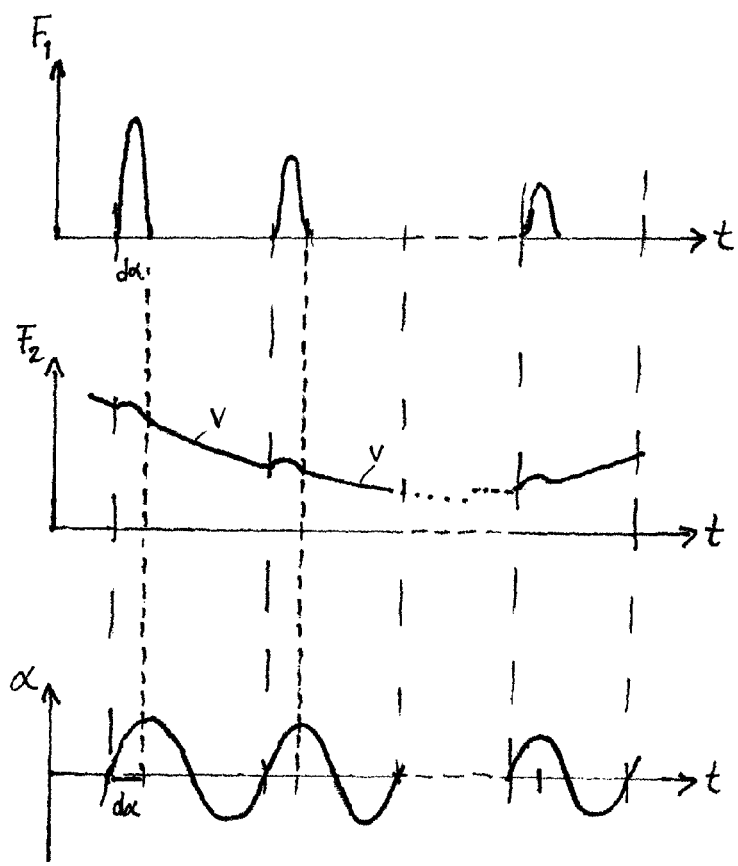
FIG. 7 shows time-dependent signals of both force sensors, as well as the angular position of the measuring roll.

The signals of both force sensors 5, 6 are acquired in order to carry out the measurement. These time-dependent signals F1, F2 of the first and the second sensor 5, 6 are illustrated in the two upper diagrams in FIG. 7. A relatively long time period, in which the temperature T of the measuring roll 3 significantly fluctuates, elapses between the first two signals and the last signal shown. The prestress V behaves accordingly and initially decreases before it subsequently increases. The lower diagram shows the angular position $\alpha$ in dependence on the time. This angular position does not have to be separately determined, but is also illustrated in this figure in order to provide a better overview.

The upper curve shows the measuring signal F1 of the first force sensor 5 that represents the force transferred from the strip 2 to the measuring roll 3 while the force sensor system 1 is positioned within the angular segment $d\alpha$ of the wrap angle 12 of the strip 2. Since this force sensor 5 needs to be highly sensitive, it is preferably realized in the form of a piezoelectric force sensor. This force sensor needs to be reset to zero with a reset after each revolution as indicated in the diagram.

The middle curve shows the measuring signal F2 of the second force sensor 6, the sensitivity of which is lower than that of the first force sensor 5, for example, by one centuple. The prestressing force V is now obtained from this signal. This is the force that predominates while the force sensor system 1 is positioned outside the angular segment $d\alpha$ of the wrap angle 12 of the strip 2. This respectively constant value is the prestressing force V.

The current sensitivity E of the first force sensor 5 is now determined by means of the determined current prestressing force of the second force sensor 6 based on the previously determined characteristic of the sensitivity E of the first force sensor 5 in dependence on the prestress V. The acquired force signal can now be evaluated with the correct calibration values in a not-shown evaluation unit based on the determined current sensitivity E. For this purpose, the angular position α of the measuring roll 3 can either be determined separately or obtained from the measuring signal of the second sensor 6.

The force sensor system 1 may consist, in particular, of a single sensor, into which the two sensors 5, 6 are integrated. For example, the first sensor 5 may also consist of a dynamic force sensor and the second sensor 6 may consist of an actuator.

Another advantage of the present invention can be seen in that an inventive force sensor system 1 of the type installed in FIG. 4 or illustrated as such in FIG. 8 can also be used for other applications. In such instances, the statically measuring sensor 6 can respectively measure the preload that predominates at the time of the measurement and is composed of the prestress V upon the force sensor system 1 and an additional statically acting load. This static load may be caused by the installation in a component 3 or by another static load that acts upon the location of the force sensor system 1. One example of a corresponding static signal F2 is illustrated in FIG. 9. The measuring times in such arrangements are typically very long, wherein measurements extend, for example, over months or years. FIG. 9 also shows the dynamic signal F1 that is superimposed on this static signal. Although measurements are also carried out with the second force sensor 6, the dynamic signal F1 cannot be obtained from the static signal F2 because the amplitude of F1 is lower by approximately 6 orders of magnitude ($10^6$).

Suitable applications are all instances, in particular, in which the force sensor system 1 cannot be accessed over extended periods of time or even ever again such as, for example, in submerged buoys, weather stations, satellites or nuclear reactors to name just a small selection.

The static signal F2 measured with the second, static sensor 6 can be used, in particular, for checking the quality of the dynamic signal F1 measured with the first, dynamic sensor 5. If the prestress V or preload, i.e., the static load F2, drops below a critical value in that the sensitivity E of the first, dynamic sensor 5 is no longer linearly related to the prestress V, the measuring data of the first force sensor 5 can still be evaluated with corrected reference values based on the known characteristic. However, if the preload F2 drops excessively, it can be ascertained that the data delivered by the first force sensor 5 can no longer be evaluated. It can furthermore be ascertained that the signals F1 can be evaluated again at a later time, at which F2 once again delivers higher values.

According to the invention, the force sensor system 1 claimed in the claims therefore can also be used for applications other than the processing of films and sheet metals and installed in arbitrary components 3. The prestressing device can be realized by the component.

The invention claimed is:

1. A force sensor system for measuring forces that are transferred from film strips or sheet metal strips to a measuring roll during rolling in roll stands, wherein the force sensor system can be inserted into a cylindrical bore of a measuring roll under prestress, the force sensor system comprising:
   a first force sensor that can determine a force that radially acts upon the measuring roll and that has a high sensitivity that corresponds to the required measuring sensitivity for the contact pressure of the film strip or sheet metal strip,
   a second force sensor that is a statically measuring force sensor and that can be placed under prestress by means of a prestressing device, and
   the prestressing device for simultaneously generating a prestress on the first force sensor and the second force sensor.

2. The force sensor system according to claim 1, wherein the first force sensor is a piezoelectric force sensor.

3. The force sensor system according to claim 2, wherein the second force sensor is a resistive, optical or resonant force sensor.

4. The force sensor system according to claim 1, wherein the second force sensor is a resistive, optical or resonant force sensor.

5. The force sensor system according to claim 1, wherein both force sensors are installed in the prestressing device in series.

6. The force sensor system according to claim 5, wherein each of the force sensors includes a cylindrical disc with the same base area, wherein their axes are arranged coaxially and radially to the measuring roll.

7. A method for measuring forces that are transferred from film strips or sheet metal strips to a measuring roll during rolling in roll stands by means of a force sensor system that is disposed in a cylindrical bore of the measuring roll where the force sensor system can be put under prestress, wherein the force sensor system includes a first force sensor that can determine a force that radially acts upon the measuring roll, a second force sensor, and a prestressing device for prestressing both the first and second force sensors, the first force sensor having a high sensitivity that corresponds to the required measuring sensitivity for the contact pressure of the film strip or sheet metal strip, the second force sensor being a statically measuring force sensor, wherein a characteristic of the sensitivity of the first force sensor in dependence on the prestress is known, the method comprising the following steps:
   simultaneously prestressing the first force sensor and the second force sensor;
   acquiring the force signal of the first force sensor while the force sensor system is positioned within the wrap angle of the strip such that the first force sensor;
   acquiring the prestress signal of the second force sensor while the force sensor system is positioned outside the wrap angle of the strip;
   determining the current sensitivity of the first force sensor from the prestress signal of the second force sensor by means of the known characteristic of the sensitivity on the prestress; and
   evaluating the acquired force signal based on the determined current sensitivity.

8. The method according to claim 7, wherein the angular position of the measuring roll is also determined.

9. The method according to claim 7, wherein the first force sensor is a piezoelectric force sensor.

10. The method according to claim 9, wherein the second force sensor is a resistive, optical or resonant force sensor.

11. The method according to claim 7, wherein the second force sensor is a resistive, optical or resonant force sensor.

12. The method according to claim 7, wherein both force sensors are installed in series in the prestressing element.

13. The method according to claim 12, wherein each of the force sensors includes a cylindrical disc with the same base area, wherein their axes are arranged coaxially and radially to the measuring roll.

\* \* \* \* \*